United States Patent [19]

Rubens

[11] 4,360,484
[45] Nov. 23, 1982

[54] PRESSURIZATION AND STORAGE OF THERMOPLASTIC RESIN FOAMS PRIOR TO SECONDARY EXPANSION

[75] Inventor: Louis C. Rubens, Midland, Mich.

[73] Assignee: The Dow Chemical Company, Midland, Mich.

[21] Appl. No.: 250,986

[22] Filed: Apr. 3, 1981

[51] Int. Cl.$^3$ .............................................. B29D 27/00
[52] U.S. Cl. ....................................... 264/28; 264/321
[58] Field of Search ......................... 264/53, 45.3, 321

[56] References Cited

U.S. PATENT DOCUMENTS

| | | | |
|---|---|---|---|
| 2,860,378 | 11/1958 | Urchick | 18/48 |
| 2,884,386 | 4/1959 | McMillan et al. | |
| 3,066,106 | 11/1962 | McMillan et al. | |
| 3,227,784 | 1/1966 | Blades et al. | 264/53 |
| 3,344,221 | 9/1967 | Moody et al. | 264/53 X |
| 3,381,077 | 4/1968 | Bonner | 264/53 X |
| 3,631,133 | 12/1971 | Rantigny | |
| 3,637,458 | 1/1972 | Parrish | 264/53 X |
| 3,639,551 | 2/1972 | Leach | 264/55 |
| 3,723,362 | 3/1973 | Rantigny | |
| 3,785,919 | 1/1974 | Hickman | 264/45.3 X |
| 3,787,543 | 1/1974 | Parrish | 264/53 |
| 3,953,558 | 4/1976 | Hatano et al. | 264/22 |
| 4,075,265 | 2/1978 | McClung et al. | 264/53 |

*Primary Examiner*—Philip E. Anderson

[57] ABSTRACT

A method for decreasing the density of a substantially closed-cell thermoplastic resin foam material by the secondary expansion thereof. The method comprises increasing the gas pressure within the cells, retaining that elevated cell pressure for prolonged periods and then heating the foam material above its heat plastifying temperature to cause secondary expansion thereof. In an example, a low density polyethylene material was foamed to produce a foam with a density of approximately 0.085 grams per cubic centimeter. This foam was then pressurized with nitrogen and afterward secondarily expanded to produce a foam with a density of approximately 0.036 grams per cubic centimeter.

6 Claims, No Drawings

4,360,484

PRESSURIZATION AND STORAGE OF THERMOPLASTIC RESIN FOAMS PRIOR TO SECONDARY EXPANSION

BACKGROUND OF THE INVENTION

The present invention relates in a general aspect to methods of decreasing the density of thermoplastic resin foam materials by a process of pressurization of already foamed materials followed by secondary expansion thereof. In a more particular aspect it relates to a method of pressurization and storage of such foam materials prior to secondary expansion.

It is known to produce thermoplastic resin foam materials having substantially closed-cell structures by intimately incorporating within the resin material a volatile organic liquid which vaporizes upon heating to form a gas (i.e., a so-called "physical blowing agent") or a solid substance which decomposes upon heating to form a gas (i.e., a so-called "chemical blowing agent"), and thereafter heating the composition at elevated temperatures whereby the gases created expand the thermoplastic material to form a cellular mass.

It is also known that thermoplastic resin materials, such as polystyrene, which have been foamed by the action of a volatile organic liquid producing a primary foaming gas may thereafter be induced to further expand by exposing the foamed material to another gas, such as steam or air, which has a permeability rate greater than the permeability rate of the primary foaming gas through the cell walls of the foamed mass, and subsequently reheating the foamed material to a heat softening temperature. At the heat softening temperature, the combined effect of the primary gas and the secondary gas, which had entered the cells of the foamed material primarily by osmotic pressure, causes further expansion of the initially foamed material, producing a lower density foam product.

It is further known that thermoplastic resin materials, such as polyethylene, which have been foamed by the gas emitted upon decomposition of a solid substance may thereafter be induced to further expand by heating the foamed material to a temperature near the melting point of the resin while subjecting it to a secondary gas at superatmospheric pressure, and subsequently reheating the foamed material to a heat softening temperature at a lower pressure, e.g., atmospheric pressure, thereby expanding the gas within the foam cells. The combined expansion of the primary gas and the secondary gas, which had entered the cells of the foamed material primarily because of the internal/external pressure differential, produces a lower density foam product.

In U.S. Pat. No. 3,953,558 to Hatano et al., there is disclosed a method of molding foamed synthetic resin pellets of polyolefin. In that process, foamed pellets are first prepared having a plurality of closed cells whose volume is greater than 65% of the total volume of all cells contained in the foamed pellets. Thereafter, the pellets are heated to a temperature up to the melting point of the polyolefin resin, and concurrently subjected to a gas at superatmospheric pressure. After the internal foam cell pressure has increased to an amount greater than 1.18 atmospheres, the external pressure is reduced. The pellets are immediately transferred to a mold and heated to a temperature which expands the entrained gas, thereby increasing pellet size and causing the pellets to adhere to each other, thus forming an article in the shape of the mold.

Unfortunately, however, the above-noted process requires that the pressurized foam pellets be transferred to a mold immediately after they are removed from the pressurizing vessel, therefore prohibiting transportation and/or storage of the pressurized foam pellets. Accordingly, it would be desirable to provide an improved method for pressurizing a pre-foamed thermoplastic resin material and retaining that pressure for prolonged storage periods at atmospheric pressure prior to secondary expansion.

BRIEF SUMMARY OF THE INVENTION

The present invention is an improvement in a process for decreasing the density of a thermoplastic resin foam material by secondary expansion, wherein a primarily foamed material of substantially closed-cell structure is impregnated with a gas, so that the pressure within the cells of the foam is increased to an amount greater than atmospheric, and then heated to a temperature above the melting point of the resin, thereby expanding the gas and producing a lower density foam product. The improvement of the present invention, which provides for retaining the superatmospheric internal foam pressure during storage for prolonged periods prior to secondary expansion, comprises the steps of:

(a) impregnating the primarily foamed resin material with a gas by subjecting said material to a gas at an impregnating pressure greater than atmospheric and a temperature below the melting point of the resin so that the pressure within the cells of the foamed material is increased;

(b) cooling the gas impregnated foam material to a temperature below 0° C. while maintaining the external impregnating pressure at a pressure above atmospheric pressure;

(c) releasing the external impregnating pressure while maintaining the gas impregnated foam material at a temperature below 0° C.; and (d) retaining a superatmospheric internal foam pressure during storage at an external pressure less than the impregnating pressure by maintaining the gas impregnated foam material at a temperature below 0° C.

The present process is particularly suitable for pressurizing and storing pre-foamed resin particles which will be placed in a mold and heated to a temperature at which the particles further expand and adhere to one another, forming a low density foam product in the shape of the mold. Surprisingly, it has been found that thermoplastic resin foam materials, pressurized and stored at a temperature below 0° C. according to the teachings of the present invention, will maintain an elevated internal pressure for substantial periods without appreciable decrease in that pressure. Accordingly, it is possible to prepare in advance a sufficient quantity of pressurized foam particles to provide a full capacity molding operation with a constant supply of moldable particles. Furthermore, the pressurizing and molding operations need not be performed at the same location since the pressurized particles can be transported, without appreciable loss of internal pressure, in conventional refrigerated transporting equipment.

DETAILED DESCRIPTION AND EMBODIMENTS

Primarily foamed resin materials to be pressurized according to the present invention are prepared by processes known in the art from heat foamable thermoplastic resins known to be suitable for making foamed material with a substantial amount of closed cells. Suitable foamable resins include styrenic polymer resins, e.g., copoly(styrene-acrylonitrile); olefinic polymer resins, such as polyethylene; copoly(ethylene-vinylacetate); copoly(ethylene-ethyl acrylate); polycarbonates; and other thermoplastic resins. Incorporated within these resins in manner and composition known in the art are suitable foaming agents which are solids that decompose upon heating, such as azodicarbonamide, volatile organic liquids which vaporize upon heating, such as fluorocarbons and the like, or any gaseous compound capable of forming gas cells in the resin matrix at the primary foaming temperature. In some instances, e.g., when foaming polyethylene, it may be necessary to introduce cross-linking into the resin structure to impart the desired viscoelastic properties for efficient foaming. Methods of introducing such cross-linking structure, such as by high energy radiation, are known in the art.

The primarily foamed materials of the present invention may be of any size or shape, as determined by the end use of the secondarily expanded product. When the pressurized foam material will be used in a molding operation, it is advantageous that the primarily foamed material be prepared in the shape of particles or pellets so that material will more easily fill the mold, and so that the material will be more uniformly heated during the molding process. Methods for performing such molding operations are disclosed in U.S. Pat. No. 3,953,558 and are hereby incorporated by reference in the present application.

When a pre-foamed thermoplastic resin material of substantially closed-cell structure is subjected to gas at superatmospheric pressure, foam volume immediately decreases. At a constant external pressure, this compression relaxes or decreases linearly with the square root of time as the external gas enters the cells of the foamed material and thereby reduces the internal/external pressure differential. Compression recovery rates are dependent upon temperature and will vary with pressure differential, material thickness, gas type, resin composition, and amount of crystalline structure in the resin. When foam material prepared from low density polyethylene, for example, is subjected to gaseous nitrogen at 50 psig, the compression recovery rate is most rapid at temperatures from about 70° C. to about 90° C.; that rate decreases at temperatures above about 90° C. It appears that the impregnating gas permeability through the thin membrane cell walls and into the cells of the foam primarily governs recovery rate at lower temperatures while the elastic retractive forces of the polymer network become important at higher temperatures as approaching the crystalline melting point of the polymer. Consequently, it is particularly advantageous to determine the temperature at which the volume recovery rate under pressure is maximized for each different thermoplastic resin foam used, and to perform the pressurizing operation at about that temperature. Contrary to the teachings of U.S. Pat. No. 3,953,558, it is not always preferable to operate at a temperature as close as possible to the melting point of thermoplastic resin. Furthermore, it would be most disadvantageous in the case of polyethylene to operate at a temperature greater than 90° C.

Generally, any desired gas can be used as the secondary foaming gas to pressurize the cells of the primarily foamed thermoplastic resin material. Examples of some gases are nitrogen, helium, neon, argon, air, gaseous chlorofluorocarbons, hydrocarbon gases, and the like. The gases may be used alone or in mixture. Preferably, the secondary gas has a permeability rate greater than or equal to the permeability rate of the primary foaming gas through the cell walls of the foamed resin.

When the primarily foamed material is subjected to a secondary gas at an impregnating pressure greater than atmospheric, the secondary gas permeates into the cells, causing the pressure within the cells of the foam material to increase, thereby providing the blowing stress for secondary expansion when the foam material is later heat plastified at an external pressure less than the impregnating pressure, such as atmospheric pressure. The excess internal cell pressure, (i.e., the amount by which the increased pressure within the cells exceeds external pressure during secondary expansion), determines the density and volume of the final foamed product. Accordingly, the amount of impregnating gas (the impregnation pressure) required will be determined by the end use of the secondarily expanded foam. If desired, the secondary expansion process may be repeated to further reduce the density of the foam product. The ability of the foamed resin material to further accept the pressurizing gas will decrease and eventually terminate as the cell walls and struts of the foam material are stretched and strained by cell expansion. The ultimate limit of volume expansion (or the minimum achievable foam density) is therefore inherently determined by the nature of the resin composition used.

When the desired amount of gas has permeated the primarily foamed material during pressurization as measured by the degree of recovery from the initial volume decrease, the temperature is reduced to below 0° C. while maintaining superatmospheric pressure, and then the pressure in the pressurizing vessel is reduced while maintaining temperature below 0° C. during storage. Advantageously, the external pressure during storage will be atmospheric, but a lower or higher pressure may be maintained if desired. As disclosed in U.S. Pat. No. 3,953,558, internal cell pressure rapidly decreases if the pressurized foam material is exposed to atmospheric pressure at room temperature. Since gas permeability is dependent upon temperature, however, lowering the temperature will reduce the rate at which gas escapes from the foam cells. In the case of polyethylene prepared by the high pressure method of polymerization, for example, extrapolation of published permeability data would suggest that nitrogen retention will increase 15 to 20 fold by cooling the pressurized foam material from +20° C. to −20° C. Surprisingly, it has been discovered that nitrogen retention increases 150 to 200 fold under those conditions. Consequently, the pressurized foam particles may be stored for substantial periods at that temperature without appreciable loss of internal cell pressure.

The present invention is not limited to use in any one particular system or apparatus, so long as the vessel employed for pressurizing the pre-foamed thermoplastic resin material is capable of withstanding the changes in temperature and pressure encountered. It should be noted, recognizing that energy is required to heat and cool the foam material as well as heating and cooling the large pressurizing vessel itself, that insulation may be advantageously employed to minimize heat transfer between the vessel containing foam material and its surroundings.

It should also be pointed out that since the foam material is at least partially compressed while under pressure and since internal foam pressure is greater than atmospheric after performing the pressurizing operation, once the pressure in the vessel is reduced to atmospheric, the pressurized foam material will immediately recover from its compressed state and return to or slightly exceed its original volume. Because of this volume change, foam material in particle form tends to physically interlock during the decompression stage. No interparticle fusion occurs, but expanded particles exert pressure against the vessel walls and against one another preventing easy removal. One solution to this problem is to incrementally increase pressure during the compression stage and/or incrementally reduce the pressure during decompression. It was observed that if the pressure during the compression stage is gradually increased to operating pressure, the initial decrease in foam volume is significantly less than it is when the pressure is immediately increased. Consequently, settling of the foam particles was reduced, thereby decreasing the extent of particle expansion and interlocking upon decompression.

The following specific examples illustrate the invention but are not to be taken as limiting its scope. Parts and percentages are by weight unless otherwise indicated or required by context.

EXAMPLE 1

A low density polyethylene (LDPE) composition was prepared by admixing 100 parts of the polymer, having standard Melt Index of 5.5 and density of 0.915 g/cc, and 5 parts of azodicarbonamide foaming agent. The mixture was heat-plastified at minimum temperature (140°-150° C.) to soften the resin without decomposing the azodicarbonamide and extruded into strands having a diameter of about 0.76 cm. The strands were cut into pieces about 0.86 cm long and irradiated with 3.5 megarads beta-radiation from a Van de Graaff generator to effect partial cross-linking of the polymer structure. The pieces were then heated for 2 minutes in a molten salt bath composed of about 53% potassium nitrate, 40% sodium nitrite, and 7% sodium nitrate, maintained at a temperature of 260° C. Roughly cylindrical shaped foam pieces were obtained, having diameter of about 1.75 cm, length of about 1.95 cm, and density of about 0.085 g/cc. The foam pieces were of substantially closed-cell structure.

These primarily foamed pieces were placed in a vessel which was pressurized with nitrogen at 80° C. and 50 psig. The foam particles immediately compressed about 65%, i.e., to 35% of their initial volume. After 15 hours, the compression had reduced to 35% (i.e., the particles had returned to 65% of their initial volume), and the foam material had absorbed 0.125 gram nitrogen per 100 cc initial cell volume. The vessel was then cooled to −20° C. and subsequently depressurized to atmospheric pressure.

The foam pieces were immediately transferred to an oven and heated at 125° C. for 2 minutes. The product obtained by this secondary expansion had a density of about 0.036 g/cc.

EXAMPLE 2

Strips of LDPE were prepared and foamed with azodicarbonamide as in Example 1, having a primary foam density of 0.082 g/cc. These strips were pressurized with nitrogen at 75° C. and 50 psig until about 3% nitrogen by weight foam had been absorbed by the foam. The percentage nitrogen is determined by weighing the foam containing the absorbed nitrogen, dividing by the weight of the foam sample before nitrogen was absorbed, subtracting one from that quantity and multiplying the difference by one hundred. The strips were stored at different temperatures (i.e., +23° C., −20° C. and −70° C.), at atmospheric pressure to determine the effect of temperature on gas retention. The amount of nitrogen in the strips stored at about +23° C. for 10 hours had decreased to about 0.2%, whereas the nitrogen in the strips stored for 10 hours at −20° C. had only decreased to about 2.6%. Pressurized strips stored at −70° C. showed no measurable weight loss after 10 days at atmospheric pressure.

What is claimed is:

1. In a process for decreasing the density of a thermoplastic olefin polymer resin foam material by secondary expansion, wherein a primarily foamed material of substantially closed-cell structure is impregnated with a gas, so that gas pressure within the cells of the foam is increased to an amount greater than atmospheric, and then said material is heated to a temperature above the melting point of the resin, thereby further expanding the primarily foamed material and producing a lower density foam product, the improvement, which allows retention of the superatmospheric internal foam pressure during storage prior to secondary expansion, comprising the steps of:
 (a) impregnating the primarily foamed resin material with a gas by subjecting said material to a gas at an impregnating pressure greater than atmospheric and a temperature below the melting point of the resin so that the pressure within the cells of the foamed material is increased;
 (b) cooling the gas impregnated foam material to a temperature below 0° C. while maintaining the external impregnating pressure at a pressure above atmospheric pressure;
 (c) releasing the external impregnating pressure while maintaining the gas impregnated foam material at a temperature below 0° C.; and
 (d) retaining a superatmospheric internal foam pressure during storage at an external pressure less than the impregnating pressure by maintaining the gas impregnated foam material at a temperature below 0° C.

2. The method of claim 1, wherien the thermoplastic resin foam material is prepared from a partially cross-linked olefin polymer resin composition with a blowing agent.

3. The method of claim 1, wherein the thermoplastic resin foam material is prepared from a low density polymer of ethylene, partially cross-linked by high energy radiation, containing a foaming agent.

4. The method of claim 3 wherein the foam material is heated during pressurization to a temperature from about 70° C. to about 90° C.

5. The method of claim 1, wherein the gas impregnated foam material is cooled to and stored at a temperature of about −20° C.

6. The method of claim 1, wherein the gas impregnated foam material is stored at atmospheric pressure.

* * * * *